United States Patent [19]

Gilmore et al.

[11] Patent Number: 4,639,273
[45] Date of Patent: Jan. 27, 1987

[54] ASPHALT-ADHESION IMPROVING ADDITIVES PREPARED BY FORMALDEHYDE CONDENSATION WITH POLYAMINES

[75] Inventors: Dennis W. Gilmore, Fairfield; Thomas G. Kugele, Cincinnati, both of Ohio

[73] Assignee: Morton Thiokol, Inc., Chicago, Ill.

[21] Appl. No.: 522,751

[22] Filed: Aug. 12, 1983

Related U.S. Application Data

[63] Continuation-in-part of Ser. No. 492,136, May 6, 1983, abandoned.

[51] Int. Cl.$^4$ .............................................. C09D 3/24
[52] U.S. Cl. ........................... 106/281 N; 106/273 N; 208/44
[58] Field of Search ............... 106/273 N, 281 N, 277; 208/44, 22

[56] References Cited

U.S. PATENT DOCUMENTS

| 3,259,512 | 7/1966 | Dickson et al. | 106/273 |
|---|---|---|---|
| 3,511,774 | 5/1970 | Long et al. | 208/251 |
| 3,615,797 | 10/1971 | Ohtsuka | 106/278 |
| 3,928,061 | 12/1972 | Hellsten et al. | 106/273 N |
| 4,176,115 | 11/1979 | Hartman | 523/179 |

FOREIGN PATENT DOCUMENTS

| 7140874 | 12/1971 | Japan . |
|---|---|---|
| 7203836 | 2/1972 | Japan . |
| 7310372 | 4/1973 | Japan . |
| 7343701 | 6/1973 | Japan . |
| 7434520 | 7/1974 | Japan . |
| 7507619 | 3/1975 | Japan . |
| 7539318 | 4/1975 | Japan . |
| 7575617 | 6/1975 | Japan . |
| 7107310 | 6/1972 | South Africa . |

OTHER PUBLICATIONS

Derwent Abstract, Accession No. 771065-AE, Japanese Pat. No. JA-7140874-R, Yatanabe 10/6/66.
Derwent Abstract, Accession No. 81-35664D/20, Russian Pat. No. 622253-A, 4/11/77.

Primary Examiner—Amelia B. Yarbrough
Attorney, Agent, or Firm—George F. Wheeler; Richard J. Sheridan

[57] ABSTRACT

Formaldehyde adducts of amines, polyamines and amides conforming to the general formula

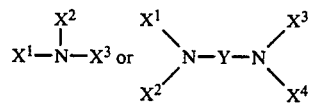

are employed in asphalt compositions in order to improve the overall adhesion between the asphalt and aggregate or glass fiber or glass fiber mesh and to thereby increase the tensile strength of the asphalt composition.

35 Claims, No Drawings

ASPHALT-ADHESION IMPROVING ADDITIVES PREPARED BY FORMALDEHYDE CONDENSATION WITH POLYAMINES

CROSS REFERENCE TO RELATED APPLICATIONS

This application is a continuation-in-part of U.S. Ser. No. 492,136, filed May 6, 1983 now abandoned. The subject matter of this application is related to the disclosure in a copending application, U.S. Ser. No. 522,952, filed Aug. 12, 1983 by a different inventive entity.

BACKGROUND OF THE INVENTION

The present invention relates to the production of asphalt compositions, such as those used in paving and roofing applications, which have increased tensile strength and increased adhesion between the asphalt and the filler, e.g. mineral aggregate or glass fiber or a glass fiber mesh.

Asphalt may be generally described as a dark-brown to black cementitious material, solid or semi-solid in consistency, in which the primary constituents are a mixture of paraffinic and aromatic hydrocarbons and heterocyclic compounds containing sulfur, nitrogen and oxygen. As discussed in *The Asphalt Handbook* (The Asphalt Institute Manual, Series No. 4, 1965 ed.), incorporated herein by reference, various grades of asphalt may be produced by selecting different processing conditions. In this regard, two basic types of solid asphalt, asphalt cement and air-blown asphalt, and two basic types of liquid asphalt, cutback asphalt and emulsified asphalt, are utilized commercially. Asphalt cement is defined as asphalt which has been refined to meet paving and industrial specifications, cutback asphalt is asphalt cement which has been liquified by blending with petroleum solvents; and asphalt emulsions are prepared such that the asphalt is emulsified in the inner phase (an oil-in-water type emulsion). The emulsion can also be of the water-in-oil type in which water constitutes the inner phase (see Hellsten et al, "Asphalt Compositions Having Improved Adhesion To Aggregate", U.S. Pat. No. 3,928,061).

The particle size of mineral aggregate used in an asphalt composition may vary over a wide range, such as from $2\times10^{-5}$ to $6\times10^{-2}$ meters in diameter, or the aggregate may be of a fairly uniform size. Mineral aggregates employed in asphalt compositions also range in character from hydrophilic to hydrophobic. It has long been known that mineral aggregates have a greater attraction for water than for oil or asphalt. In general it can be said that siliceous and acidic minerals such as sands and gravels tend to be very hydrophilic whereas calcareous and alkaline materials such as limestone tend to be slightly hydrophilic. It is difficult, therefore to obtain and maintain a satisfactory asphalt coating on the mineral aggregate particles when water is present. One example of an asphalt composition is the combination of asphalt cement with a size-graded mineral aggregate. This combination is referred to as asphalt concrete and is used in road paving applications. A poor asphalt coating on the mineral aggregate leads to break up of the asphalt concrete and commonly results in potholes and flaking pavements.

One common method of pavement construction is to remove water from the aggregate by forced evaporation prior to coating with asphalt cement. In practice, this requires a certain amount of aggregate drying time which consumes energy and may result in a lengthened construction period. If weather conditions are unfavorable, such as during periods of rainfall or high humidity, road construction may be severely hindered if not halted. Even if the water is removed and the asphalt successfully deposited onto the aggregate, the asphalt coating may ultimately be degraded by the action of groundwater or rainfall.

A successful method of increasing pavement life has been to add one or more antistripping additives to the asphalt compositions. Such additives increase the hydrophobicity of the aggregate, thereby strengthening and preserving the asphalt-aggregate bond. While antistripping additives have been found to be successful in certain paving and roofing applications, conventional asphalt compositions employing such additives are still limited in that the strength of the asphalt-aggregate bond is often not sufficient to resist damage from prolonged conditions of stress and wear.

Accordingly, it is an object of the present invention to provide for an asphalt composition employing amine derivatives which will increase the overall bond strength properties of the asphalt cement and provide greater resistance to harmful environmental conditions by significantly improving the adhesion between the asphalt-aggregate bond. That and other objects of the invention will become apparent from the following detailed description and appended claims.

SUMMARY OF THE INVENTION

It has now been found that the use of certain formaldehyde adducts of amines and polyamines or amides as additives in asphalt compositions result in a surprisingly high level of adhesion between the mineral aggregate or glass fibers or glass fiber mesh and asphalt, and thus an improved overall composition tensile strength.

There can be used for example 0.2 to 2.0, (preferably 0.3 to 1.0) parts of adduct per 100 parts by weight of asphalt.

In particular, the present invention relates to the modification of amines or amides by reaction with formaldehyde or a conventional source of formaldehyde such as paraformaldehyde, trioxane or hexamethylenetetramine and the use of such compounds as additives in asphalt compositions. The products formed by such reactions may, but not necessarily, be further reacted with epoxides to form additional amine or amide compounds according to the invention.

The amines and amides which form the starting materials for the invention are taken from the following general formulae:

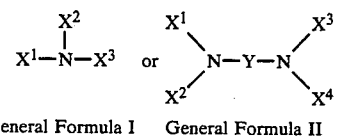

General Formula I   General Formula II where:

$X^1$, $X^2$, $X^3$, $X^4$ are the same or different and can be

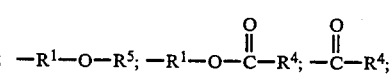

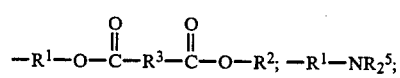

-continued

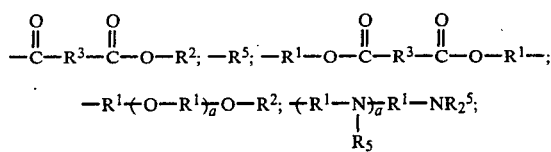

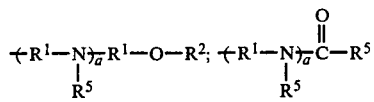

and hydrogen or forms a 5 or 6-membered ring containing at least one nitrogen atom and carbon atoms with or without oxygen atoms and can be substituted by $R^5$. Illustrative ring systems include morpholine, piperizine, piperidine and imidazoline.

In all of the amine or amide systems mentioned above at least one nitrogen must not be tertiary (i.e. at least one X or one $R^5$ must be hydrogen).

Y is selected from the group consisting of

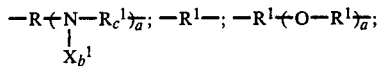

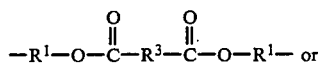

forms a 6-membered ring containing two nitrogens (such a structure then requires only one X to be attached to the nitrogen).

R is alkylene up to six carbon atoms, e.g. methylene, ethylene, hexamethylene or cyclohexamethylene; and can form a 6-membered ring with two nitrogens.

$R^1$ is alkylene, e.g. methylene, ethylene hexamethylene or even up to eicosanylene; cycloalkylene, e.g. cyclohexamethylene; arylene, e.g. phenylene or naphthylene; hydroxy, ester or hydrocarbyl-substituted alkylene, cycloalkylene and arylene.

$R^2$ is alkyl, e.g. methyl, ethyl, butyl, eicosanyl; cycloalkyl, e.g. cyclohexyl; aryl, e.g. phenyl or naphthyl; alkaryl, e.g. tolyl; aralkyl, e.g. benzyl; or the previous substituted by hydroxy or ester. $R^2$ can also be hydrogen.

$R^3$ is alkylene; cycloalkylene; arylene or the previous substituted hydrocarbyl, hydroxy, ester; —CH=CH—. Illustrative groupings for $R^1$ apply equally here.

$R^4$ is alkenyl, e.g. propenyl, hexenyl, octadecenyl; alkyl; aryl; alkaryl; aralkyl; cycloalkyl; or the previous substituted by hydroxy or ester;

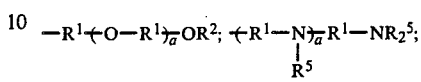

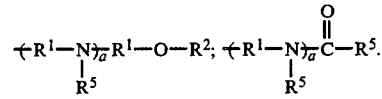

Illustrative groupings for $R^2$ apply equally here.

$R^5$ is hydrogen; alkenyl; alkyl; cycloalkyl; aryl; alkaryl; aralkyl; or the previous substituted by hydroxy, ester, alkyl imidazoline or alkenyl imidazoline; alkyl imidazoline or alkenyl imidazoline;

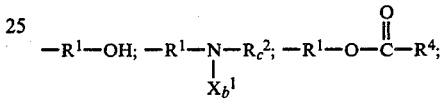

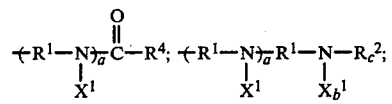

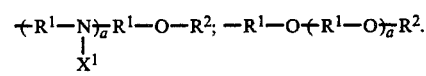

a is 0 to 6; b is 0, 1, 2; c is 0, 1, 2. With the proviso that when a compound of General Formula I contains at least two nitrogen atoms this compound is not within General Formula II.

The following chart illustrates examples of amines and amides within General Formula I which are useful in obtaining the end products according to the invention.

| Example No. | $X^1$ | $X^2$ | $X^3$ |
|---|---|---|---|
| 1. | $CH_3(CH_2)_{10}-CH_2-$ | $-CH_2CH_2OH$ | $-H$ |
| 2. | $CH_3(CH_2)_{12}-CH_2-O(CH_2-\underset{H}{\overset{CH_3}{C}}-O)_2CH_2-\underset{H}{\overset{CH_3}{C}}-$ | $-H$ | $-H$ |
| 3. | $CH_3-$ | $CH_3-$ | $-H$ |
| 4. | $O\begin{smallmatrix}CH_2CH_2-\\ \\CH_2CH_2-\end{smallmatrix}$ | | $-H$ |
| 5. | $\phenyl-CH_2-$ | $CH_3-$ | $-H$ |

-continued
| Example No. | X$^1$ | X$^2$ | X$^3$ |
|---|---|---|---|
| 6. | 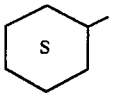 | —H | —H |
| 7. | 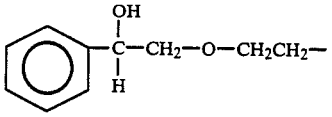 | —H | —H |
| 8. | 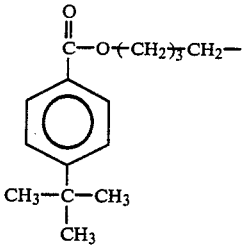 | —H | —H |
| 9. | 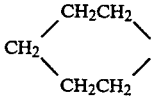 | | —H |
| 10. | 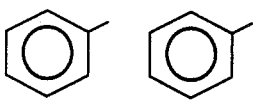 | | —H |
| 11. | 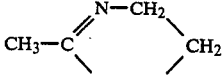 | | —H |
| 12. | 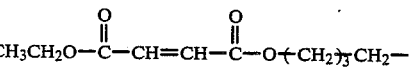 | —H | —H |
| 13. | 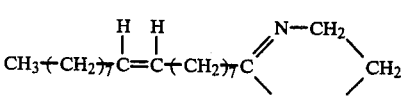 | | —H |
| 14. | 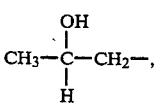 | Same as X$^1$ | —H |
| 15. | 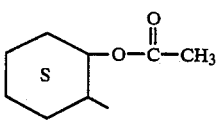 | —H | —H |
| 16. | 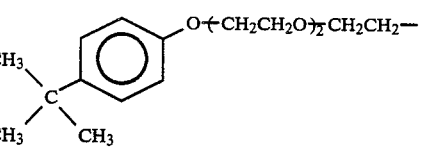 | Same as X$^1$ | —H |
| 17. |  | —H | —H |

| Example No. | X$^1$ | X$^2$ | X$^3$ |
|---|---|---|---|
| 18. | $CH_3(CH_2)_{17}-CH_2-\overset{O}{\underset{\|}{C}}-$ | $-CH_2-\underset{CH_3}{\overset{CH_3}{\underset{\|}{\overset{\|}{C}}}}-OH$ | —H |
| 19. | $C_6H_5-\overset{O}{\underset{\|}{C}}-$ | $-CH_2CH_2(-O-CH_2CH_2)_2-O-CH_2CH_3$ | —H |
| 20. | $CH_3-\overset{O}{\underset{\|}{C}}-$ | Same as X$^1$ | —H |
| 21. | $CH_3(CH_2)_{16}-CH_2-$ | $-\overset{O}{\underset{\|}{C}}(CH_2)_4CH_3$ | —H |
| 22. | $CH_3(CH_2)_{10}-CH_2-O-\overset{O}{\underset{\|}{C}}-CH_2-\overset{O}{\underset{\|}{C}}-$ | $-CH_2-\underset{H}{\overset{CH_2CH_3}{\underset{\|}{\overset{\|}{C}}}}(CH_2)_3CH_3$ | —H |
| 23. | $HO(CH_2)_3CH_2-$ | $HO(CH_2)_3CH_2-$ | —H |

The following chart illustrates examples of amines and amides within General Formula II which are useful in obtaining the end products according to the invention.

| Example No. | $X^1$ | $X^2$ | $X^3$ | $X^4$ | Y |
|---|---|---|---|---|---|
| 1. | —H | —H | —H | —H | ![phenylene] |
| 2. | ![PhCH(OH)CH2—] | —H | Same as $X^1$ | —H | —CH$_2$CH$_2$—O—CH$_2$CH$_2$— |
| 3. | CH$_3$— | —H | —CH$_3$ | —H | ![2,5-dimethylphenylene with CH3] |
| 4. | —H | —H | —H | —H | —CH$_2$CH$_2$CH$_2$—N—CH$_2$CH$_2$CH$_2$—<br>                                                            CH$_2$(CH$_2$)$_6$—CH$_3$ |
| 5. | —CH$_2$CH$_2$OH | —H | —CH$_2$CH$_2$OH | —H | —CH$_2$CH$_2$CH$_2$—N—CH$_2$CH$_2$CH$_2$—<br>                                                            CH$_3$ |
| 6. | —CH$_2$CH$_2$OH | —CH$_2$CH$_2$OH | —H | —H | $\overset{O}{\overset{\|}{-\text{CH}_2\text{CH}_2\text{O}-\text{C}}}\text{(CH}_2\text{)}_4\overset{O}{\overset{\|}{\text{C}-}}$ |
| 7. | —H | —H | —H | —H | $+\text{CH}_2)_6\text{N}-\text{CH}_2\text{CH}_2\text{O}-\text{C}=\text{O}$<br>              CH$_3$               (CH$_2$)$_4$<br>$+\text{CH}_2)_6\text{N}-\text{CH}_2\text{CH}_2\text{O}-\text{C}=\text{O}$<br>              CH$_3$ |
| 8. | —CH$_2$—C(CH$_3$)(H)—OH | —H | —CH$_2$—C(CH$_3$)(H)—OH | —H | Same as Y for Example No. 7 |
| 9. | —CH$_2$CH$_2$NH$_2$ | —H | —CH$_2$CH$_2$NH$_2$ | —H | $+\text{CH}_2)_6$ |
| 10. | —CH$_2$CH$_2$OCH$_2$CH$_3$ | —H | —CH$_2$CH$_2$OCH$_2$CH$_3$ | —H | $+\text{CH}_2)_6\overset{H}{\text{N}}+\text{CH}_2)_6$ |

-continued

| Example No. | $X^1$ | $X^2$ | $X^3$ | $X^4$ | Y |
|---|---|---|---|---|---|
| 11. | $\begin{array}{c}CH_3\\ \phantom{x}\diagdown\\ N-CH_2(CH_2)_4CH_2-\\ \phantom{x}\diagup\\ CH_3\end{array}$ | —H | Same as $X^1$ | —H | —CH$_2$CH$_2$— |
| 12. | CH$_3$CH$_2$OCH$_2$CH$_2$—N(CH$_2$)$_5$CH$_2$—<br>$\phantom{xxxxxxxxxxxxxxxx}$ H | —H | —H | —H | (CH$_2$)$_4$ |
| 13. | —CH$_2$CH$_2$OH | — | —H | — | $\begin{array}{c}CH_2CH_2\\ \diagup\phantom{xx}\diagdown\\ \phantom{xx}\phantom{xx}\\ \diagdown\phantom{xx}\diagup\\ CH_2CH_2\end{array}$ |
| 14. | $\phi$—CH$_2$— | — | —H | — | $\begin{array}{c}CH_2CH_2\\ \diagup\phantom{xx}\diagdown\\ \phantom{xx}\phantom{xx}\\ \diagdown\phantom{xx}\diagup\\ CH_2CH_2\end{array}$ |
| 15. | $\begin{array}{c}O\phantom{xxxx}O\\ \parallel\phantom{xxxx}\parallel\\ CH_3O-C-CH=CH-C-\end{array}$ | — | —H | — | $\begin{array}{c}CH_2CH_2\\ \diagup\phantom{xx}\diagdown\\ \phantom{xx}\phantom{xx}\\ \diagdown\phantom{xx}\diagup\\ CH_2CH_2\end{array}$ |
| 16. | $\begin{array}{c}O\\ \parallel\\ CH_3C-\end{array}$ | —H | —H | —H | naphthalene-1,8-diyl |
| 17. | $\begin{array}{c}O\\ \parallel\\ \phi-C-O-CH_2\end{array}$ | —H | —CH$_2$CH$_3$ | —CH$_2$CH$_3$ | (CH$_2$)$_3$ |
| 18. | $\begin{array}{c}\phantom{xx}O\phantom{xxxxxx}O\\ \phantom{xx}\parallel\phantom{xxxxxx}\parallel\\ CH_3(CH_2)_{10}-CH_2O-C-CH_2-C-O-CH_2CH_2-\end{array}$ | —H | —H | —H | —CH$_2$CH$_2$—O—CH$_2$CH$_2$— |

-continued

| Example No. | $X^1$ | $X^2$ | $X^3$ | $X^4$ | Y |
|---|---|---|---|---|---|
| 19. | $CH_3-\overset{O}{\underset{\|}{C}}-\underset{H}{N}-CH_2CH_2-$ | $-H$ | $-CH_2CH_2-NH_2$ | $-H$ | $+CH_2\frac{1}{6}$ |
| 20. | $\begin{array}{c}CH_2-CH_2\\ \|\qquad\|\\ O\qquad N-CH_2CH_2-NCH_2CH_2CH_2-\\ \|\qquad\|\qquad\|\\ CH_2-CH_2\qquad H\end{array}$ | $-H$ | Same as $X^1$ | $-H$ | $+CH_2\frac{1}{6}$ |
| 21. | $\begin{array}{c}CH_2-CH_2\\ \|\qquad\|\\ O\qquad N-CH_2CH_2O-\overset{O}{\underset{\|}{C}}-CH_2-\overset{O}{\underset{\|}{C}}-OCH_2CH_2-\\ \|\qquad\|\\ CH_2-CH_2\end{array}$ | $-H,$ | $-H$ | $-H$ | $+CH_2\frac{1}{2}$ |
| 22. | $HOCH_2CH_2-$ | $-H$ | $HOCH_2CH_2-$ | $-H$ | $-CH_2CH_2O-\overset{O}{\underset{\|}{C}}-CH=CH-\overset{O}{\underset{\|}{C}}-O-CH_2-CH_2-$ |
| 23. | $\begin{array}{c}CH_2-CH_2\\ \|\qquad\|\\ H-N\qquad N-\\ \|\qquad\|\\ CH_2-CH_2\end{array}$ | | $-CH_3$ | $-CH_3$ | $+CH_2\frac{1}{3}$ |
| 24. | $\begin{array}{c}CH_2-CH_2\\ \|\qquad\|\\ O\qquad N-\\ \|\qquad\|\\ CH_2-CH_2\end{array}$ | | $-CH_3$ | $-CH_3$ | $+CH_2\frac{1}{3}$ |
| 25. | $-H$ | $-H$ | $-H$ | $-H$ | $\begin{array}{c}CH_3\\ \|\\ -CH_2-C-O+CH_2-\overset{CH_3}{\underset{\|}{C}}\frac{1}{2}H\\ \|\\ CH_3\end{array}$ |
| 26. | $\begin{array}{c}CH_2CH_2\\ \overset{O}{\underset{\|}{C}}-N\qquad\\ CH_3C\qquad\\ CH_2CH_2\end{array}$ | | $-CH_3$ | $-H$ | $-CH_2CH_2-O-CH_2CH_2-$ |

-continued

| Example No. | $X^1$ | $X^2$ | $X^3$ | $X^4$ | Y |
|---|---|---|---|---|---|
| 27. | $CH_3-C\overset{\displaystyle N-CH_2}{\underset{\displaystyle CH_2}{\diagdown\!\!\!\diagup}}$ | | —H | —H | —$CH_2CH_2$— |
| 28. | $CH_3(CH_2)_7\overset{H}{\underset{}{C}}=\overset{H}{\underset{}{C}}(CH_2)_7C\overset{\displaystyle N-CH_2}{\underset{\displaystyle CH_2}{\diagdown\!\!\!\diagup}}$ | | —H | —H | —$CH_2CH_2$— |
| 29. | $CH_3(CH_2)_7\overset{H}{\underset{}{C}}=\overset{H}{\underset{}{C}}(CH_2)_7\overset{\displaystyle O}{\underset{}{C}}-$ | Same as $X^1$ | —H | —H | $(CH_2)_5$ |

Additional examples of compounds according to General Formulae I and II are as follows:

ILLUSTRATION 1

BHMT
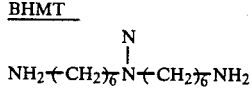

HMD

DACH
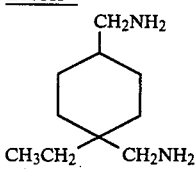

Alkoxylated BHMT
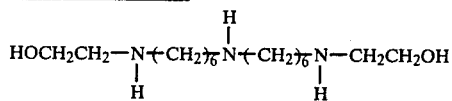

Alkoxylated HMD
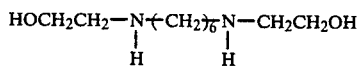

Alkoxylated DACH
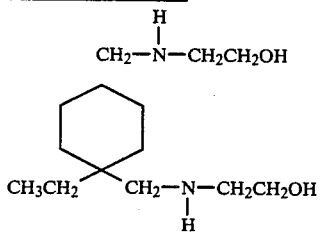

Linear polyethyleneamines
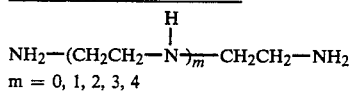
$m = 0, 1, 2, 3, 4$

TETA $(m = 2)$

Cyclic polyethyleneamines
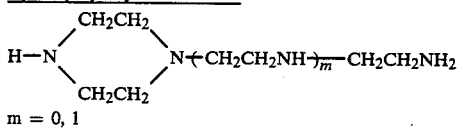
$m = 0, 1$      AEP $(m = 0)$

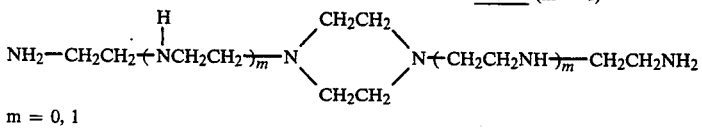
$m = 0, 1$

Alkoxylated linear polyethyleneamines
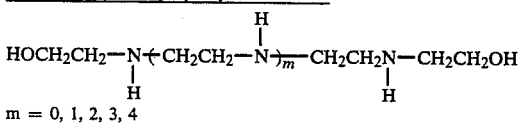
$m = 0, 1, 2, 3, 4$

Alkoxylated cyclic polyethyleneamines
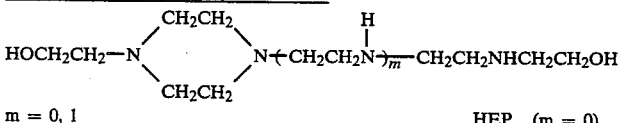
$m = 0, 1$      HEP $(m = 0)$

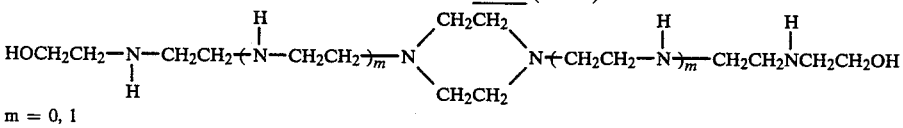
$m = 0, 1$

In order to form the products for use in asphalt compositions according to the invention, the above compounds, including any mixtures thereof, are then reacted with up to 50 weight percent formaldehyde or a conventional formaldehyde source. The various structures (generally characterized as "formaldehyde and formaldehyde equivalent adducts of amines or amides") can be illustrated as follows:

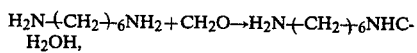

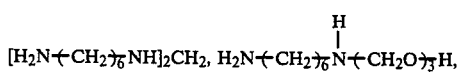

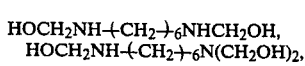

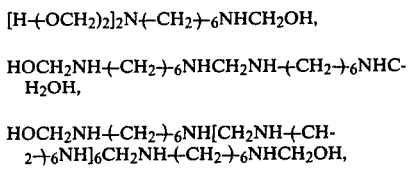

HOCH2NH(CH2)6NHCH2NH(CH2)6NHCH2OH,

HOCH2NH(CH2)6NH[CH2NH(CH2)6NH]6CH2NH(CH2)6NHCH2OH, and the like.

As formaldehyde adducts of amines and amides, the foregoing compounds may, if desired, be further reacted with ethylene oxide or ethylene oxide having at least one aryl, alkyl or cycloalkyl substituent or cyclohexylene oxide to yield products for use in asphalt compositions in accordance with the invention. Thus there can be used, for example, ethylene oxide, propylene oxide, styrene oxide, cyclohexylene oxide or isobutylene oxide. Using Illustration 1 as one example, these additional end products may be derived as follows:

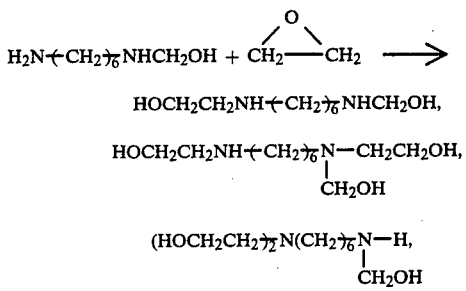

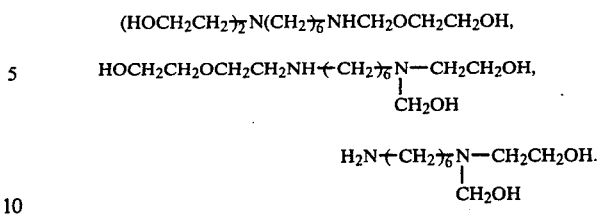

In this regard, the amines or amides and formaldehyde are combined at a temperature in which the materials remain fluid in a procedure similar to the following example.

EXAMPLE 146 grams (1.0 mole) of triethylenetetramine were placed into a three-necked flask and heated to 100° C. 36 grams (1.2 moles) of paraformaldehye were then added over a one-hour period while slowly increasing the temperature to 150° C. The mixture was held at 150° C. for one hour and produced a dark, viscous tacky liquid weighing 177 grams and having a composition similar to that described in Illustration 1.

The condensation products obtained as a result of the reactions set forth above were then added to a controlled amount of asphalt and the resultant mixtures tested and analyzed after 1, 3, 5 and 10 freeze-thaw cycles using known analytical techniques in order to determine their relative strength characteristics under both "wet" and "dry" conditions. The results are set forth in Table I below.

TABLE I

| Compound | Dry Tensile Strength[4a,b] psi | Tensile Strength Ratio[5] | | | |
|---|---|---|---|---|---|
| | | 1 FTC[4c] | 3 FTC | 5 FTC | 10 FTC |
| 1. BHMT | 123 | .89 | .83 | .79 | .62 |
| 2. BHMT + Form. (1:1)[2] | 112 | .99 | .96 | .94 | .90 |
| 3. Compound 2 + ethylene oxide (1:1)[3] | 124 | 1.02 | .96 | .90 | .82 |
| 4. BHMT + propylene oxide (1:2.5)[3] | 125 | .98 | .84 | .77 | .54 |
| 5. Compound 4 + Form. (1:2)[2] | 121 | 1.01 | .96 | .92 | .89 |
| 6. HMD | 120 | .79 | .79 | .68 | .60 |
| 7. HMD + Form. (2.9:1)[2] | 119 | .94 | .92 | .89 | .75 |
| 8. HMD + ethylene oxide (1:1.1)[3] | 136 | .94 | .81 | .64 | .49 |
| 9. Compound 8 + Form. (1.6:1)[2] | 139 | 1.01 | .90 | .85 | .79 |
| 10. HMD + styrene oxide (6:1)[3] | 124 | .83 | .84 | .74 | .59 |
| 11. Compound 10 + Form. (2:1)[2] | 119 | 1.02 | .90 | .83 | .75 |
| 12. DACH | 114 | .81 | .77 | .70 | .57 |
| 13. DACH + Form. (2:1)[2] | 117 | .88 | .82 | .79 | .66 |
| 14. TETA | 123 | .90 | .80 | .69 | .48 |
| 15. TETA + Form. (2:1)[2] | 118 | .92 | .83 | .72 | .60 |
| 16. Compound 15 + ethylene oxide (1:1.1)[3] | 129 | .94 | .88 | .81 | .66 |
| 17. TETA + Form. (1:1)[2] | 122 | .92 | .87 | .80 | .72 |
| 18. TETA + Form. (1:3.2)[2] | 124 | .99 | .94 | .87 | .78 |
| 19. AEP | 115 | .87 | .79 | .71 | .60 |
| 20. AEP + Form. (1.3:1)[2] | 109 | .89 | .78 | .75 | .69 |
| 21. HEP | 122 | .81 | .74 | .68 | .54 |
| 22. HEP + Form. (1:1)[2] | 118 | .91 | .83 | .77 | .69 |
| 23. CH3(CH2)16CH2NH2 + Form. (1:2)[2] | 120 | .84 | .73 | .68 | .64 |

TABLE I-continued

| Compound | Dry Tensile Strength[4a,b] psi | Tensile Strength Ratio[5] | | | |
|---|---|---|---|---|---|
| | | 1 FTC[4c] | 3 FTC | 5 FTC | 10 FTC |
| 24. $CH_3{\operatorname{\text{-}}}(CH_2)_7C{=}C{\operatorname{\text{-}}}(CH_2)_7C{-}N{-}CH_2CH_2CH_2$ + Form. (4:1) with H, H substituents and $CH_3{-}N{-}CH_3$ | 127 | .92 | .81 | .70 | .67 |

NOTES:

[1] Each additive is tested at a use level of 0.5% based upon asphalt weight.

[2] The mole ratio of amine or alkoxylated amine to formaldehyde or formaldehyde equivalent is given in parenthesis as (moles amine:moles formaldehyde).

[3] The mole ratio of amine or formaldehyde amine adduct to epoxide is given in parenthesis as (moles aminie:moles epoxide).

[4a] All specimens are of the following formula:
94.5% granite gneiss aggregate
5.5% AC-20 asphalt (containing 0.5 weight percent additive).

[4b] Testing was conducted in accordance with the indirect tensile strength measurement of asphalt concrete as described by R. P. Lottman in NCHRP Report 192 for single FTC measurements.

[4c] FTC = Freeze-Thaw Cycles.

[5] Tensile Strength Ratio = $\dfrac{\text{Tensile Strength-Wet Conditioned Specimens}}{\text{Tensile Strength-Dry Unconditioned Specimens}}$ The comparative strength and ratio values set forth in Table I confirm that asphalt compositions containing compounds in accordance with the present invention exhibit significant increases in resistance to water damage relative to compositions which do not contain such additives. For comparison purposes consider the Tensile Strength Ratio values given in Table I for Compounds 1 and 2. It is evident that the formaldehyde adduct imparts significant moisture stability as the wet tensile strength of the asphalt concrete after ten freeze-thaw cycles is 90% of the dry control tensile strength. This 10% reduction in tensile strength is compared to a 38% reduction noted after ten freeze-thaw cycles for the asphalt concrete containing Compound 1. A performance improvement such as this is quite unexpected since it is known that formaldehyde adducts of amines are sensitive to hydrolysis conditions (see *Formaldehyde*, J. Frederic Walker, Second Edition, 1953, Reinhold Publishing Corporation). Similar improvements are also noted for the other compounds given in Table I.

While the invention herein has been shown and described in what is presently conceived to be the most practical and preferred embodiment thereof, it will be apparent to those of ordinary skill in the art that many modifications may be made within the scope of the invention, which scope is to be accorded the broadest interpretation of the appended claims, so as to encompass all the equivalent methods and structures.

What is claimed is:

1. A composition of matter comprising
(a) an asphalt, and
(b) a formaldehyde adduct of an amine or amide, said formaldehyde adduct comprising a compound or mixture of compounds produced by the reaction of a formaldehyde source with an amine or amide having a formula selected from:

General Formula I
$$X^1{-}\underset{\underset{X^2}{|}}{N}{-}X^3;$$

General Formula II
$$\begin{array}{c} X^1 \\ \diagdown \\ X^2 \end{array} N{-}Y{-}N \begin{array}{c} \diagup X^3 \\ \diagdown X^4 \end{array};$$

General Formula III
$$X^1{-}N{\overset{\displaystyle Z^1}{\underset{\displaystyle Z^2}{\diagup\!\!\!\diagdown}}}N{-}X^3$$

and adducts of said amines and amides with ethylene oxide; alkyl cycloalkyl, or aryl-substituted ethylene oxide; or cyclohexylene oxide; wherein:

i. $X^1$, $X^2$, $X^3$, and $X^4$ are independently selected from:

$-R^1{-}O{-}R^5$;

$-R^1{-}O{-}\underset{\underset{}{\overset{\overset{O}{\|}}{C}}}{}{-}R^4$;

$-\underset{\underset{}{\overset{\overset{O}{\|}}{C}}}{}{-}R^4$;

$-R^1{-}O{-}\overset{\overset{O}{\|}}{C}{-}R^3{-}\overset{\overset{O}{\|}}{C}{-}O{-}R^2$;

$-R^1{-}NR_2^5$;

$-\overset{\overset{O}{\|}}{C}{-}R^3{-}\overset{\overset{O}{\|}}{C}{-}O{-}R^2$;

$-R^5$;

$-R^1{-}O{-}\overset{\overset{O}{\|}}{C}{-}R^3{-}\overset{\overset{O}{\|}}{C}{-}O{-}R^1{-}$;

$-R^1{\operatorname{\text{-}}}(O{-}R^1)_a{-}O{-}R^2$;

${\operatorname{\text{-}}}(R^1{-}N)_a{-}R^1{-}O{-}R^2$;
          $|$
          $R^5$ ${\operatorname{\text{-}}}(R^1{-}N)_a{-}\overset{\overset{O}{\|}}{C}{-}R^5$;
          $|$
          $R^5$ and hydrogen; or $X_1$ and $X_2$ or $X_3$ and $X_4$ together form a 5 or 6-membered ring containing at least one nitrogen atom, optionally substituted by oxygen or $R^5$, provided that at least one X or one $R^5$ must be hydrogen;

ii. Y is selected from the group consisting of

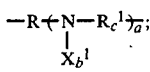

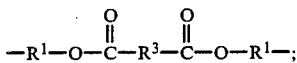

iii. $Z^1$ and $Z^2$ are independently selected from ethylene and substituted ethylene;
iv. R is selected from alkylene of from one to six carbon atoms and a 6-membered ring with two nitrogens;
v. $R^1$ is alkylene of from 1 to 20 carbon atoms, cycloalkylene, arylene, or the previous substituted by hydroxy, ester or hydrocarbyl-substituted alkylene;
vi. $R^2$ is alkyl of from 1 to 20 carbon atoms, cycloalkyl, aryl, alkaryl, aralkyl, hydrogen, or the previous substituted by hydroxy or ester;
vii. $R^3$ is alkylene, cycloalkylene, arylene, or the previous substituted by hydrocarbyl, hydroxyl, ester or

—CH=CH—;

viii. $R^4$ is alkenyl of from 1 to 20 carbon atoms, alkyl, aryl, alkaryl, aralkyl, or cycloalkyl, optionally substituted by hydroxy or ester;

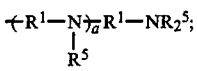

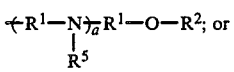

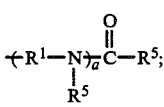

ix. $R^5$ is hydrogen; alkenyl, alkyl, cycloalkyl, aryl, alkaryl, aralkyl, alkyl imidazoline, alkenyl imidazoline, or the previous substituted by hydroxy, ester, alkyl imidazoline or alkenyl imidazoline;

—$R^1$—OH;

or

—$R^1$—O—($R^1$—O—)$_a R^2$;

x. a is 0 or 1; b is 0, 1, or 2; c is 0, 1, or 2; and
xi. compounds which contain at least two nitrogen atoms are not within the scope of General Formula I if they fall within the scope of General Formula II.

2. The composition of claim 1 wherein said formaldehyde adduct is further reacted with ethylene oxide; ethylene oxide containing an alkyl, cycloalkyl or aryl substituent; or cyclohexylene oxide.

3. The composition of claim 1 wherein said amine conforms to said General Formula I.

4. The composition of claim 1 wherein said amine conforms to said General Formual II.

5. The composition of claim 1 wherein said amine possesses at least one X which is:

—$R^1$—O—$R^5$.

6. The composition of claim 1 wherein said amine possesses at least one X which is:

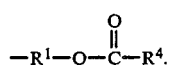

7. The composition of claim 1 wherein said amine possesses at least one X which is:

8. The composition of claim 1 wherein said amine possesses at least one X which is:

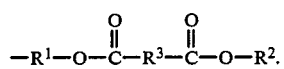

9. The composition of claim 1 wherein said amine possesses at least one X which is:

—$R^1$—$NR_2^5$.

10. The composition of claim 1 wherein said amine possesses at least one X which is:

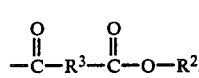

11. The composition of claim 1 wherein said amine possesses at least one X which is:

—$R^5$.

12. The composition of claim 1 wherein said amine possesses at least one X which is:

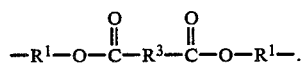

13. The composition of claim 1 wherein said amine possesses at least one X which is —$R^1$—(O—$R^1$—)$_a$O—$R^2$.

14. The composition of claim 1 wherein said amine possesses at least one X which is:

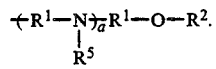

15. The composition of claim 1 wherein said amine possesses at least one X which is:

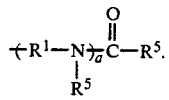

16. The composition of claim 1 wherein said amine possesses at least one X which is hydrogen.

17. The composition of claim 1 wherein said amine possesses at least one Y which is:

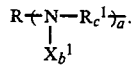

18. The composition of claim 1 wherein said amine possesses at least one Y which is:

$-R^1-$.

19. The composition of claim 1 wherein said amine possesses at least one Y which is:

$-R^1\!+\!OR^1\!\!\rightarrow_a$.

20. The composition of claim 1 wherein said amine possesses at least one Y which is:

21. The composition of claim 1 wherein said amine possesses at least one Y which forms a six-membered ring containing two nitrogen heteroatoms.

22. The composition of claim 1 wherein said amine possesses at least one X which forms a 5- or 6-membered ring containing at least one nitrogen heteroatom, carbon atoms and optionally oxygen atoms, and is optionally substituted by $R^5$.

23. The composition according to claim 1 including a filler.

24. A composition according to claim 23 wherein the filler comprises mineral aggregate, the amount of said adduct being sufficient to impart improved tensile strength properties to the composition of asphalt and aggregate.

25. A composition according to claim 23 wherein the filler comprises glass fibers.

26. A composition according to claim 23 wherein the filler comprises a glass fiber mesh.

27. A composition according to claim 1, wherein said amines and amides are adducted with ethylene oxide; alkyl, cycloalkyl, or aryl-substituted ethylene oxide; or cyclohexylene oxide.

28. A method for improving the tensile strength properties of a composition comprising asphalt coated filler, comprising the steps of:

A. Adding to said asphalt, prior to coating said filler, a formaldehyde adduct of an amine or amide with said adduct formed by the reaction between a formaldehyde source and an amine having a formula selected from:

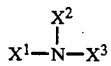

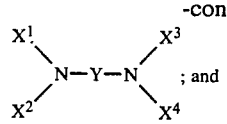

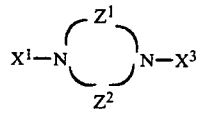

and adducts of said amines and amides with ethylene oxide; alkyl, cycloalkyl, or aryl-substituted ethylene oxide; or cyclohexylene oxide; wherein:

i. $X^1$, $X^2$, $X^3$, and $X^4$ are independently selected from:

$-R^1-O-R^5$;

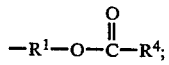

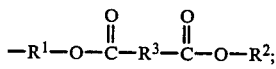

$-R^1-NR_2^5$;

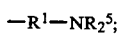

$-R^5$;

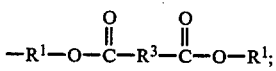

$-R^1\!+\!O-R^1\!\!\rightarrow_a\!O-R^2$;

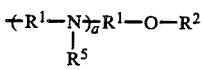

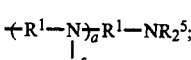

and hydrogen; or $X_1$ and $X_2$ or $X_3$ and $X_4$ together form a 5 or 6-membered ring containing at least one nitrogen atom optionally substituted by oxygen or $R^5$, provided that at least one X or one $R^5$ must be hydrogen;

ii. Y is selected from the group consisting of

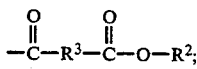

$-R^1-$;

$-R^1\!+\!O-R^1\!\!\rightarrow_a$; or

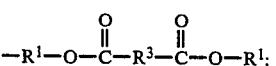

iii. $Z_1$ and $Z_2$ are independently selected from ethylene and substituted ethylene;

iv. R is selected from alkylene of from one to six carbon atoms and a 6-membered ring with two nitrogens;
v. $R^1$ is alkylene of from 1 to 20 carbon atoms cycloalkylene, arylene, or the previous substituted by hydroxy, ester or hydrocarbyl-substituted alkylene;
vi. $R^2$ is alkyl of from 1 to 20 carbon atoms, cycloalkyl, aryl, alkaryl, aralkyl, hydrogen, or the previous substituted by hydroxy or ester;
vii. $R^3$ is alkylene, cycloalkylene, arylene, or the previous substituted by hydrocarbyl, hydroxyl, ester, or

—CH=CH—;

viii. $R^4$ is alkenyl of from 1 to 20 carbon atoms, alkyl, aryl, alkaryl, aralkyl, or cycloalkyl, optionally substituted by hydroxy or ester;

$-R^1 \mathrm{+\!\!O-R^1 \!\!\!+_a OR_2};$ $\mathrm{+\!\!R^1-N\!\!\!+_a R^1-NR_2^5};$
    |
    $R^5$ $\mathrm{+\!\!R^1-N\!\!\!+_a R^1-O-R^2};$ or
    |
    $R^5$ -continued $\mathrm{+\!\!R^1-N\!\!\!+_a \overset{O}{\overset{\|}{C}}-R^5};$
    |
    $R^5$ ix. $R^5$ is hydrogen; alkenyl, alkyl, cycloalkyl, aryl, alkaryl, aralkyl, alkyl imidazoline, alkenyl imidazoline, or the previous substituted by hydroxy, ester, alkyl imidazoline or alkenyl imidazoline:

$-R^1-OH$;

or $-R^1-O+R^1-O+_a R^2$;

x. a is 0 or 1; b is 0, 1, or 2; c is 0, 1, or 2; and
xi. compounds which contain at least two nitrogen atoms are not within the scope of General Formula I if they fall within the scope of General Formula II;
B. and then coating said filler with said asphalt.
29. The method of claim 28, wherein said filler comprises glass fiber mesh.
30. The method of claim 28, wherein said filler is glass fiber.
31. The method of claim 28, wherein said filler is mineral aggregate.
32. A product made by the process of claim 28.
33. A product made by the process of claim 29.
34. A product made by the process of claim 30.
35. A product made by the process of claim 31.

* * * * *

UNITED STATES PATENT AND TRADEMARK OFFICE
CERTIFICATE OF CORRECTION

PATENT NO. : 4,639,273

DATED : January 27, 1987

INVENTOR(S) : Dennis W. Gilmore and Thomas G. Kugele

It is certified that error appears in the above-identified patent and that said Letters Patent is hereby corrected as shown below:

Column 4, line 4, insert -- by -- after "substituted".
Column 18, line 1, the heading --ILLUSTRATION 1 -- should be moved to column 18, line 59.
Column 20, line 20, change "paraformaldehye" to -- paraformaldehyde --.
Column 22, line 28, insert a comma between "alkyl" and "cycloalkyl"; line 44, reverse the positions of the subscript 2 and the superscript 5.
Column 23, line 1, reverse the positions of the subscript c and the superscript 1; line 37, reverse the positions of the subscript 2 and the superscript 5; line 55, insert the following formula:

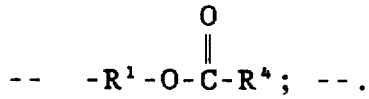

UNITED STATES PATENT AND TRADEMARK OFFICE
CERTIFICATE OF CORRECTION

PATENT NO. : 4,639,273

DATED : January 27, 1987

INVENTOR(S) : Dennis W. Gilmore and Thomas G. Kugele

It is certified that error appears in the above-identified patent and that said Letters Patent is hereby corrected as shown below:

Column 24, line 5, change "Formual" to -- Formula --; line 34, reverse the positions of the subscript 2 and the superscript 5.

Column 25, line 12, reverse the positions of the subscript c and the superscript 1; line 41, delete "The" and insert therefor -- A --.

Column 26, line 30, reverse the positions of the subscript 2 and the superscript 5; line 46, reverse the positions of the subscript 2 and the superscript 5; line 58, insert a single bond in the formula between the "N" and "$X_b^1$".

Column 27, line 29, reverse the positions of the subscript 2 and the superscript 5.

Column 28, line 14, insert the following formula:

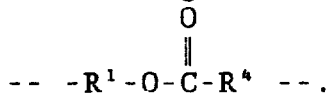

Signed and Sealed this

Tenth Day of January, 1989

Attest:

DONALD J. QUIGG

Attesting Officer

Commissioner of Patents and Trademarks